United States Patent [19]
Schmidt

[11] 4,234,241
[45] Nov. 18, 1980

[54] STEREO LINE SCANNER

[75] Inventor: Erich Schmidt, Munich, Fed. Rep. of Germany

[73] Assignee: Deutsche Forschungs- und Versuchsanstalt fur Luft- und Raumfahrt e.V., Köln-Porz, Fed. Rep. of Germany

[21] Appl. No.: 59,660

[22] Filed: Jul. 23, 1979

[30] Foreign Application Priority Data

Aug. 2, 1978 [DE] Fed. Rep. of Germany ....... 2833808

[51] Int. Cl.³ ............................................. G02B 27/17
[52] U.S. Cl. ....................................... 350/6.9; 358/88; 358/109
[58] Field of Search ................ 356/2, 11, 12; 350/6.5, 350/6.9, 285, 299; 250/558; 358/88, 92, 109, 285

[56] References Cited

U.S. PATENT DOCUMENTS

| | | | |
|---|---|---|---|
| 2,988,953 | 6/1961 | Barnett | 356/2 |
| 3,004,464 | 10/1961 | Leighton et al. | 356/2 |
| 3,109,057 | 10/1963 | Slavecki et al. | 358/109 |

*Primary Examiner*—Richard A. Rosenberger
*Attorney, Agent, or Firm*—Frishauf, Holtz, Goodman & Woodward

[57] ABSTRACT

A 45° rotary mirror illuminates a detector through an optical collecting system and while facing downwards picks up a direct or primary line scan of objects located below in the plane of scanning. While facing upwards, the rotary mirror picks up a secondary line scan indirectly from below by reflection from a non-revolving plane mirror at an acute angle to the axis of rotation of the rotary mirror, which angle corresponds to the base angle of stereo scanning when the primary line scans are correlated with corresponding secondary line scans that respectively precede them by an interval corresponding to the travel time of the movable craft upon which the line scanner is carried along a base line distance determined by the inclination of the non-revolving plane mirror. That inclination is adjustable about a hinge axis perpendicular to the direction of travel of the carrying aircraft or spacecraft. The average angle of sight of scanned objects is adjustable in elevation and also, for drift compensation purposes, in azimuth. The laser of the heightfinding system can be incorporated into the scanner, directing its light to another 45° mirror rotating back to back with the first, so that back-scattered laser light will be picked up by the scanner's detector to make possible calibration of the stereoscopic parameters, as well as showing the ground track on stereoscopic pictures produced by processing the detector output.

7 Claims, 5 Drawing Figures

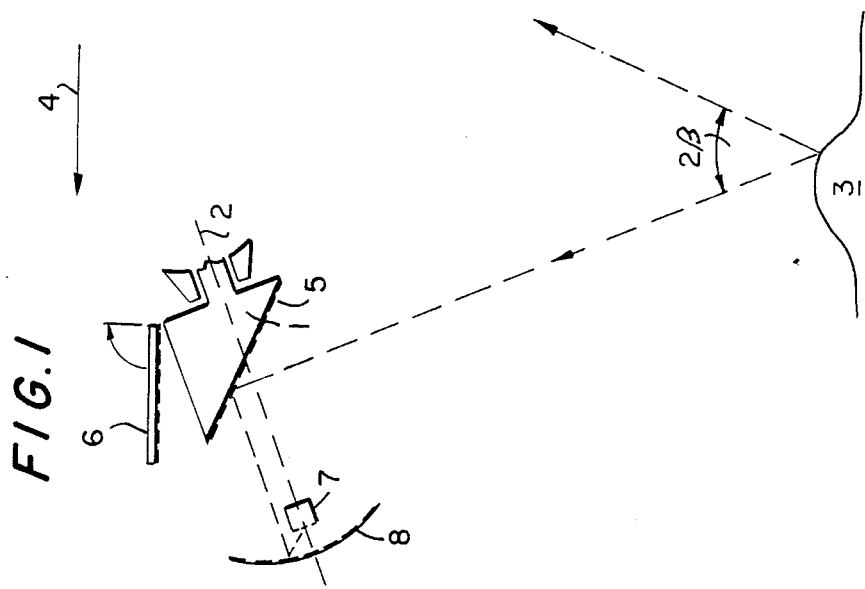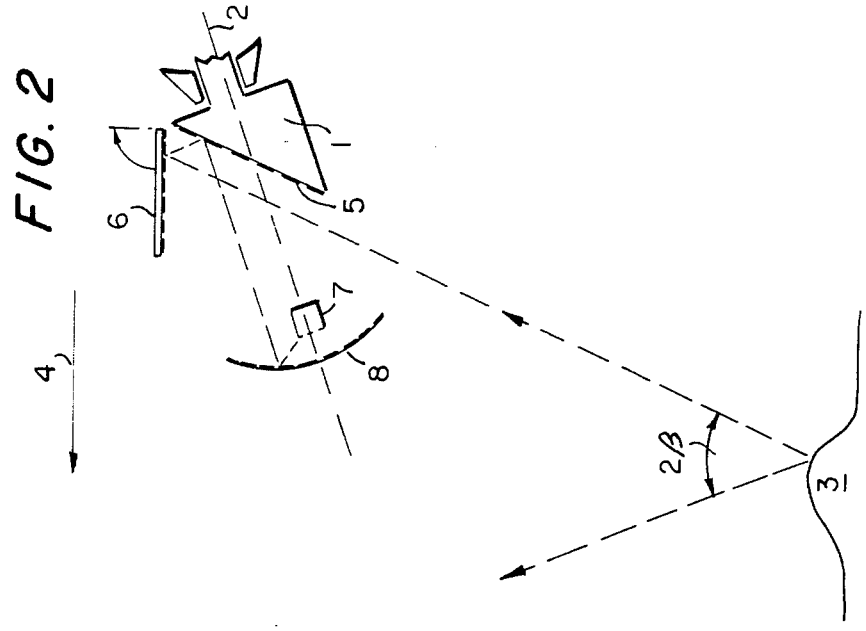

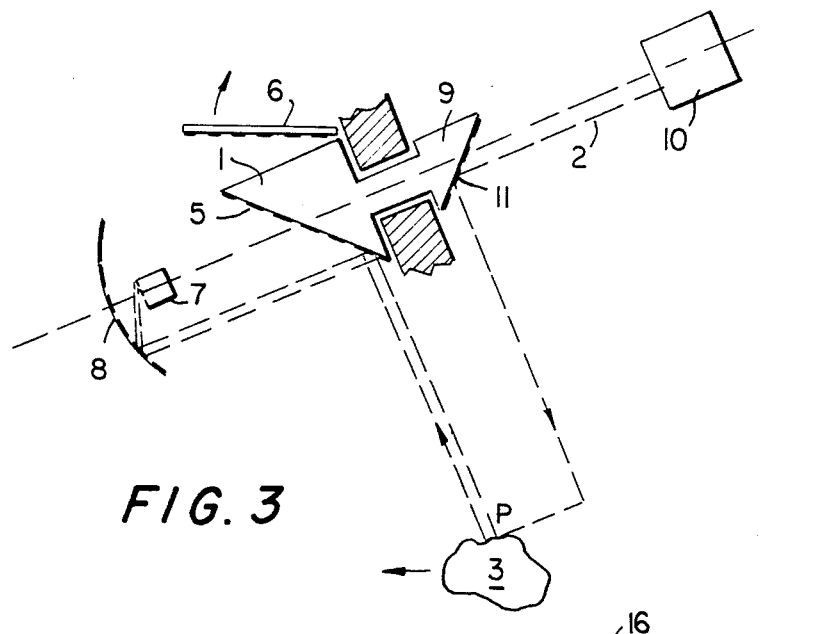
FIG. 3
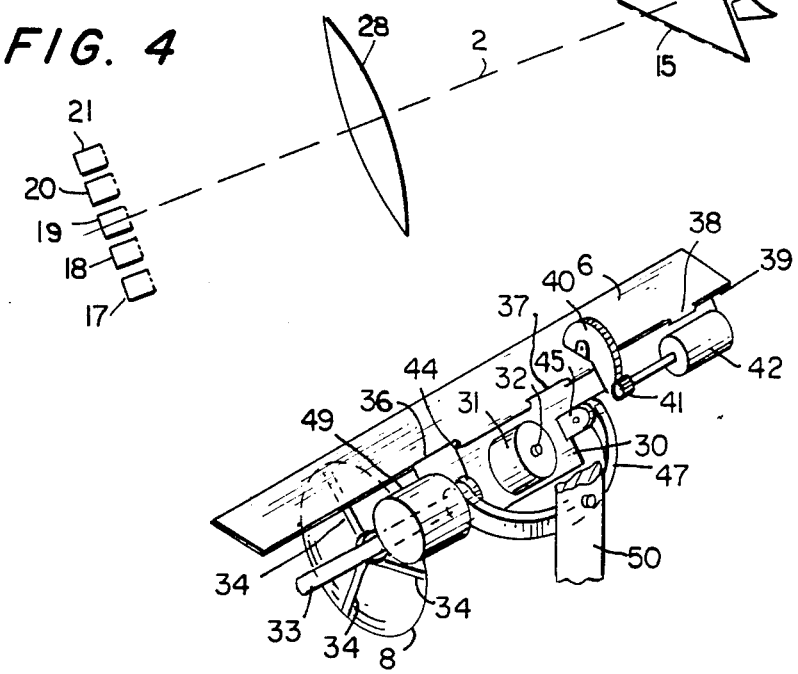
FIG. 4
FIG. 5

STEREO LINE SCANNER

This invention concerns a line scanner for stereo linear mapping for scanning, for example, a succession of parallel lines on the ground from an air or spacecraft above it, and scanning each line from two different points spaced in the direction of travel of the craft so as to provide stereo location data of the features detector along the line of scan.

Stereo line scanners are used particularly for aircraft and spacecraft for recording of stereoscopic data for purposes of stereo mapping, determining the position of clouds and cloud patterns, observing surface structures on the earth, locating objects in surrounding space and exploring other planets, sattelites, etc., from a spacecraft. This is usually done by optical means and the information may be detected photoelectrically and recorded on magnetic tape. In this way, pictures can be obtained at various wavelengths or wavelength ranges of visible light, as well as in infrared light, some of these pictures being the so-called panorama pictures. In scanners for these purposes currently known, the scanning is done either with two differently directed scanning systems, or with a single scanning system that discontinuously is swung back to the picture beginning. With continuous scanning, a common detector arrangement or a common revolving rotary prism and a detector device can be used. With the rotary prism type of known device, a conical scan is produced and consequently a variable base-height ratio (Lorenz, 40 Bul. (1972) pp. 120–122; Leberl, id. pp. 228–230, and Lorenz, 43 Bul. (1975) pp. 76–77).

A system for linear convergent scanning has been described, furthermore, in which are provided two deflecting mirrors and a common rotatable deflecting prism truncated at a 45° angle (Jerie, 1976-2, ITC Journal pp. 357–363). Although the last-mentioned system for both scanning directions essentially utilizes common elements and obtains a linear stereo scan, this system also has the disadvantage that the mirror surface of the fixed deflection mirrors is large, particularly for base angles of at least 30°, which is to say particularly for a wide angle scan, and further that the bearing of the rotatable deflecting prism hangs downwards, so that it can only with difficulty be integrated or incorporated into a flying instrument carrier.

It is an object of the invention to provide a stereo line scanner that overcomes, so far as possible, the above-mentioned difficulties, and one in which a compact mirror arrangement is used for the production of stereoscopic pictures, particularly one in which the fixed mirror surfaces are reduced in size and the number of mirrors also reduced, and one in which the mounting of the rotatable deflecting prism is easy to incorporate in the instrument carrier.

SUMMARY OF THE INVENTION

Briefly, the axis of rotation of the deflecting mirror prism is directed either parallel to the direction of flight of the carrier or at an acute angle thereto, and preferably is arranged so it can be swung downward from parallelism with the direction of flight to suit the occasion, and the mirror arrangement comprises a plane deflecting mirror so disposed that a primary scan ray is deflected directly to the neighborhood of the detector by the reflecting face of the prism, while a secondary scan ray is deflected first by the non-revolving plane mirror and only then by the deflecting prism to the neighborhood of the detector. In the neighborhood of the detector or between the prism and the detector, an optical collecting system is provided to focus the scanning beam on the detector. The primary scanning ray can then be correlated stereoscopically with a secondary scanning ray detected and recorded at an earlier moment in the flight of the carrier.

For varying the base angle, namely the angle between the primary and secondary scanning rays, the non-revolving mirror is mounted so as to swing about an axis perpendicular to the direction of flight of the vehicle that carries the scanning system, preferably a horizontal axis when the scanning relates to a horizontal plane below the craft.

For varying the average angle of sight to a remotely lying object, the entire scanning system is arranged so it can be swung towards and away from the direction of flight.

For increase of the resolution with constant speed of revolution of the deflecting prism, the detecting device may include a number of detectors in the image plane of the optical collecting system and a particularly useful arrangement of this sort involves a row of detecting elements in that image plane which also lie in a plane passing through the axis of revolution of the prism and a line normal to the non-revolving mirror. This last-mentioned arrangement is suitable for simultaneously scanning adjacent parallel lines.

It is useful as a further development of the invention to provide a laser light source on an extension of the axis of rotation of the deflecting prism in the direction away from the optical collecting system for the detector, with a second rotary reflector turning with the rotary prism being provided to deflect the ray of the laser in the same direction as the primary scanning ray, so that back-scattered laser light, picked up at the same time as the light obtained by passive scanning (i.e. from the same point) can be used for direct distance measurement for calibrating the stereoscopically shown height.

In the stereo line scanner of the present invention, it is particularly advantageous that the beam of primary rays is only reflected once, namely by the 45° oblique surface of the rotary prism, and only the beam of secondary rays needs to be reflected by the adjustably fixed plane mirror, as well as by the rotary mirror. Thus, when the line scanner is mounted on an instrument carrier moving at uniform velocity, each picture line of the object or objects being observed can be scanned at two different moments at different angles of sight with respect to the direction of flight. Thus, a dual stereoscopically evaluatable coverage can be obtained of the object overflown, for example a region of the earth's surface above which the carrier is flying.

According to an advantageous further development of the invention, by swinging the plane of the adjustably fixed deflecting mirror, the base-height ratio can be varied, whereas by swinging the entire scanner the average angle of sight (the bisector of the primary and secondary rays observed) can be shifted forward or aft. Likewise, scanning lines running oblique to the direction of flight can be adjusted in azimuth by repositioning of the entire system to correct for carrier drift.

The scanning system of the present invention has the great advantage, compared to the above-mentioned system described by Jerie in the ITC Journal, that for a base angle of 45° and a scanning angle of ±60°, the aggregate surface of the fixed deflection mirror is reduced by the factor 4.7 for the same optically effective surface, whereas the surface reduction for the same scanning angle and a base angle of 30° is still just 2.8. Since in the case of the scanning system of the present invention the axis of swing of the non-revolving plane mirror is mounted perpendicular to the direction of flight and horizontally in the usual case of overflying a horizontal surface, the scanning system lends itself much more easily to incorporation in the instrument-carrying craft. Furthermore, in the scanning system of the present invention, only one mirror, namely the non-revolving mirror, needs to be adjusted to obtain operativeness of the system. We already mentioned single deflection of the primary ray as a further advantage, for reasons of sensitivity, etc.

As already mentioned, the stereo scanner can also be equipped with a built-in laser heightfinder, so that in addition to the height determination, a horizontal speed determination is also possible.

The rotary prism is normally of circular periphery (i.e. a cylinder) and it must be understood that the word "prism" is used in its mathematical sense, which includes a cylinder as one form of prism. Of course the prism, or cylinder, is just a convenient way of rotating a plane mirror about an oblique axis through its center.

The invention is further described by way of examples with reference to the annexed drawings, in which:

FIG. 1 is a diagram of an embodiment of the stereo line scanner of the invention illustrating the reception of a primary ray from an object;

FIG. 2 is another diagram of the scanner of FIG. 1 showing the reception of a secondary ray from the same object;

FIG. 3 is a diagram of the scanner of FIGS. 1 and 2 modified for incorporation of a laser heightfinder;

FIG. 4 is a diagram of a modification of the scanner of FIGS. 1 and 2 having a plurality of detectors aligned in a row in the image plane of the optical collecting system, and FIG. 5 is a diagrammatic perspective view of the scanner of the kind of FIGS. 1 and 2, illustrating means for swinging the non-revolving mirror and for swinging the scanning system as a whole.

As shown in FIG. 1, a reflecting surface 5 rotated about an axis at 45° to the reflecting plane is provided by the cylindrical deflecting prism 1, which is arranged to revolve about the axis 2. It is assumed that the carrier craft, upon which the illustrated scanner is mounted, is flying above an object 3 in the flight direction indicated by the arrow 4. The oblique plane of truncation 5 of the cylinder 1, at 45° to the axis 2, always reflects towards the detector 7 light received at right angles to the axis 2 and thus, during part of each revolution, scans a line, or rather a series of lines offset from each other in the direction 4, going across the object 3, causing a beam of reflected light to be collected by the optical system 8 for concentration or focussing on the detector 7. In the illustrated case, the optical system 8 is a parabolic mirror beyond the detector 7. The detector 7 may, for example, be a photoelectric detector producing an electrical signal which is then transferred, by means not shown, to a magnetic tape or disc record, which may then be processed to produce pictures in a well-known manner.

As shown in FIG. 2, during another part of the revolution of the cylinder 1, light from the object 3 is deflected by the plane mirror 6 so as to be reflected again at right angles by the surface 5 of the cylinder 1 towards the optical system 8 for reception by the detector 7. FIGS. 1 and 2 are arranged in the drawing to illustrate that the secondary ray reception illustrated by FIG. 2 precedes the primary ray reception from the same object illustrated by FIG. 1 as the carrier craft moves in the direction 4, and the difference in the angle of sight, which provides the possibility of stereoscopic correlation of two scans of the same line thus illustrated, is designated in the conventional way as $2\beta$, this being known as the base angle corresponding to the base length along which the carrier craft flies, for the particular altitude. In the special case in which the base angle is 45° and the inclination of the non-revolving plane mirror 6 with respect to the axis of rotation 2 is 22.5°, the non-revolving plane mirror 6 can be immediately adjacent to the revolving cylinder 1 without being shadowed thereby. In this special case, the reflecting surface of the non-revolving mirror 6 is at a minimum.

FIG. 3 shows incorporation of a laser heightfinder in the stereo line scanner of the present invention. The monochromatic light of the laser 10 is radiated along the rotation axis 2 of the scanner to a second rotating mirror surface 11 at 45° to the axis 2 formed by the second cylindrical rotary prism 9 obliquely truncated at right angles to the truncation surface 5, so as to be directed towards whatever object is being scanned at the moment by primary rays therefrom reflected by the surface 5 in the manner of FIG. 1. The displacement of the surface 11, with respect to the surface 5, along the axis 2, is negligible for the scanning of remote objects. In the arrangement shown in FIG. 3, the laser is not used during that portion of revolution of the prisms 1 and 9, during which the beam of secondary rays is being received by the scanner in the manner shown in FIG. 2, but if desired a second non-revolving plane mirror, located in a manner corresponding to that of the mirror 6, could be used for providing further utilization of the laser 10. This is generally not necessary, since the information available from the arrangement of FIG. 3 is sufficient for height finding. The monochromatic coherent light from the laser which is scattered back by the object 3, reaches the detector 17 along with the beam of other light reflected towards the detector 7 by the rotary reflecting surface 5 of the prism 1. The laser light is provided in pulses, preferably synchronized with downward looking of the mirror 11, so that the time lapse between emission by the laser 10 and reception by the detector 7 of the monochromatic light can be measured to determine the height, from which measurement the height errors of the stereo pictures produced by the scanner can be corrected, and the horizontal direction of movement (the "ground track" direction with respect to the picture produced) can be determined. Instead of one mirror 11, centered in the rotary axis, several mirrors, which are fixed excentrically can be used, in order to synchronize the prism 1, taking account the time elapse between emission and reception of the laser light.

The resolution in the direction of flight depends upon the rate of rotation of the rotary mirror and the speed of travel of the carrier craft. In FIG. 4, in order to increase the resolution without raising the rate at which the cylinder 1 revolves, a row of detectors 17, 18 . . . 21 is arranged for simultaneous detection of adjacent parallel lines by the light reflected towards these detectors by the rotary mirror surface 15. In order to improve the resolution also within the scanning line, preferably a field arrangement of detectors is used. In this case a lens 28 is used as the optical collecting system. The detectors 17-21 are aligned in a row lying in the plane which contains the axis 2 and also the normal to the non-revolving mirror 16. A parabolic mirror arranged as shown in FIGS. 1-3 could be used instead of the lens 8 in this case, since the amount of light that fails to reach one detector because it is blocked by the others is still only a small part of the total light gathered by the optical system when a parabolic mirror is used. The detectors 17-21 are of course aligned in the image plane of the optical system. If a mosaic of detectors were used occupying more space in the image plane than the detector row shown in FIG. 4, or if the detectors are bulky, it may be useful to use a lens rather than a mirror to collect the light, at least when visible light is used.

Since the drawings are diagrammatic, no attempt has been made to show the profile of the reflector 8 in such a form as to put the focus of the reflector as the detector 7, although it is to be understood that the detector 7 is in the focal plane, which is to say the image plane, of the optical system. It is also to be understood that the optical system may be more highly corrected, for good resolution than a parabolic mirror or a single element lens when a number of detectors are used, so that some detectors are off the axis of the optical system.

FIG. 5 illustrates the principle of arrangements for adjusting the angle of the non-revolving mirror 6 to the axis 2 of revolution of the revolving mirror 5 of FIGS. 1-3. As shown in FIG. 5, the bearing plate 30 carries the drive motor 31 that drives the cylinder 1 and its revolving mirror face 5 by means of the shaft 32. The arm 33 and another one not visible in the picture support the parabolic mirror 8 in a position centered on the axis of the shaft 32 by means of a cross member, not visible in the picture, which passes in back of the mirror 8. The detector 7, which is not visible in FIG. 5, is mounted on the mirror 8, by means of tripod arms 34. The non-revolving plane mirror 6 is hinged at 36,37 and 38 to the bearing plate 30 and is adjustable about the hinge axis 39 by means of a gear wheel segment 40 and a pinion 41 driven by a positioning motor 42. The bearing plate 30 is mounted on journal bearings 44,45 for swinging support on the yoke 47 and is positioned in elevation (assuming that the yoke 47 is horizontal) by means of the servo motor 49. The yoke 47 is mounted on a post 50 shown as being of semicircular cross-section so as to provide a flat mounting surface for the center of the yoke 47, and it is understood that the post 50 may be continued vertically as a cylindrical shaft mounted for rotation in azimuth, so as to enable correction of the direction of the axis 2 for drift of the carrier craft, so that the azimuth of the axis 2 can be aligned with the true direction of flight of the craft with respect to the ground.

The detector 7 and the motors 31,42 and 49 are connected by wires, not shown, to appropriate equipment for recording and/or processing received data and for directing and adjusting the scanner, such equipment being so well known that it does not need to be described here.

Although the invention has been described with reference to particular illustrative examples and certain modifications and variations of these examples have been referred to, it will be understood that other modifications and variations are possible within the inventive concept.

I claim:

1. A stereo line scanner for optical radiation reception and recording to enable provision of stereoscopic picture-like representation of remote objects from a moving instrument carrier, comprising in combination:
   a rotary plane mirror provided with means for causing it to revolve about an axis at an angle of substantially 45° to its mirror plane,
   a second plane mirror in the vicinity of the periphery of said rotary mirror and having an elongated mirror surface of which the long dimension is oriented at right angles to the axis of revolution of said rotary mirror and of which the short dimension is oriented at an angle between 0° and 45° to said axis of said rotary mirror,
   a radiation detector located on said axis of said rotary mirror for registering radiation received by the scanner and directed toward said detector by reflection from said rotary mirror, and
   an optical system for collecting radiation reflected from said rotary mirror in a direction parallel to said axis of rotation thereof so as to provide said collected radiation to said detector,
   the inclination of said second plane mirror to said axis of rotation of said rotary mirror and also the inclination of said axis to the direction of movement of said instrument carrier being such, that during one portion of a revolution of said rotary mirror, radiation is receivable from objects disposed on the opposite side of said axis from said second mirror in a beam of primary rays reflected directly by said rotary mirror toward said optical collecting system and during another portion of said revolution of said rotary mirror, radiation is receivable from objects so disposed in a beam of secondary rays reflected first by said second plane mirror and then again by said rotary mirror to proceed toward said optical collecting system and said detector, whereby a line scan of said secondary rays can be correlated with a line scan of said primary rays from the same objects, but taking place after an interval determined by the movement of said carrier past said objects, to provide stereoscopic data regarding the aspect and disposition of said objects.

2. A stereo line scanner as defined in claim 1 in which said rotary mirror is constituted by an obliquely truncated cylinder mounted for revolution about the axis of its cylindrical surface.

3. A stereo line scanner as defined in claim 2 in which means are provided for swinging said second mirror about an axis substantially perpendicular to the direction of movement of said instrument carrier and thereby modifying the base angle of stereoscopic observation provided by the line scanner.

4. A stereo line scanner as defined in claim 3 in which means are also provided for swinging the line scanner as a whole for varying the average angle of sight of a remote object to be observed toward and away from a direction close to the direction of movement of said instrument carrier.

5. A stereo line scanner as defined in claim 2 in which a plurality of said detectors are provided in the image plane of said optical collecting system whereby the resolution provided by said line scanner may be raised for a given constant rate of revolution of said prism.

6. A stereo line scanner as defined in claim 5 in which said plurality of detectors are aligned in a row or in an area or field lying in a plane in which also lie said axis of rotation of said rotary mirror and a line normal to said second mirror, whereby a corresponding plurality of parallel lines may be simultaneously scanned by said line scanner.

7. A stereo line scanner as defined in claim 2 in which a laser light source is located on said axis of said rotary mirror on the side of said rotary mirror opposite to the location of said optical collecting system and in which a second rotary mirror arrangement, mounted so as to revolve with said first-mentioned rotary mirror, is provided and has an oblique reflecting surface facing said laser light source so oriented as to direct radiation from said laser light source in a direction parallel to said primary rays received by said first-mentioned rotary mirror and reflected thereby to said optical collecting system, whereby laser radiation backscattered from remote objects is simultaneously picked up with other radiation from said object by said detector in the operation of said line scanner and is usable for measuring the distance to said object to provide reference data for evaluation of stereoscopic records produced by said line scanner.

* * * * *